United States Patent [19]
Lind

[11] Patent Number: 4,537,118
[45] Date of Patent: Aug. 27, 1985

[54] FLOW DISTRIBUTOR

[76] Inventor: Leif I. Lind, Burevägen 5, 182 63 Djursholm, Sweden

[21] Appl. No.: 506,645

[22] PCT Filed: Sep. 29, 1982

[86] PCT No.: PCT/SE82/00301
§ 371 Date: May 27, 1983
§ 102(e) Date: May 27, 1983

[87] PCT Pub. No.: WO83/01290
PCT Pub. Date: Apr. 14, 1983

[30] Foreign Application Priority Data

Sep. 30, 1981 [SE] Sweden .................. 8105785

[51] Int. Cl.³ .............................................. F24F 13/06
[52] U.S. Cl. ................................... 98/40.01; 98/121.1
[58] Field of Search ............... 98/40 R, 121 R, 36, 98/40 C, 31, 103, 108

[56] References Cited

U.S. PATENT DOCUMENTS

| | | | |
|---|---|---|---|
| 173,722 | 2/1876 | Hayes | 98/121 R |
| 173,786 | 2/1876 | Hayes | 98/121 R |
| 1,520,142 | 12/1924 | Roth | 98/40 R |
| 4,170,930 | 10/1979 | Lind | 98/40 D |
| 4,316,406 | 2/1982 | Lind | 98/40 R |

FOREIGN PATENT DOCUMENTS

| | | |
|---|---|---|
| 1124658 | 5/1960 | Fed. Rep. of Germany. |
| 1759782 | 2/1972 | Fed. Rep. of Germany. |
| 2941276 | 4/1980 | Fed. Rep. of Germany. |
| 47807 | 7/1978 | U.S.S.R. .................. 98/40 R |

Primary Examiner—Henry C. Yuen
Assistant Examiner—John Kwon
Attorney, Agent, or Firm—Fleit, Jacobson, Cohn & Price

[57] ABSTRACT

A flow distributor capable of forming a defining wall of a duct or chamber having further defining walls comprises a profiled, apertured plate. The plate is provided with profile sections or wall sections which extend transversally of the direction of the main flow immediately downstream one or more apertures. The profile sections form baffle means for dividing the main flow of medium into a plurality of part flows and for deflecting said part flows through respective apertures to the opposite side of said defining wall. Located between the profile sections are substantially planar, apertured sections which extend in parallel with or are inclined to the direction of the main flow, while forming an arrangement of step-like or shoulder-like protrusions. Alternatively, the plate may exhibit adjacent one or more of said apertures corrugations which curve inwardly or outwardly towards and away from said flow, a part of which corrugations forms said profile sections.

9 Claims, 7 Drawing Figures

Fig.1
Fig. 2
Fig.3
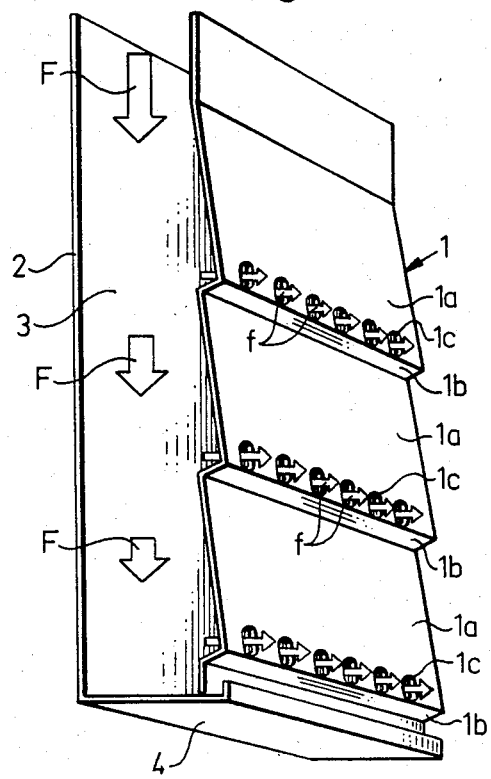
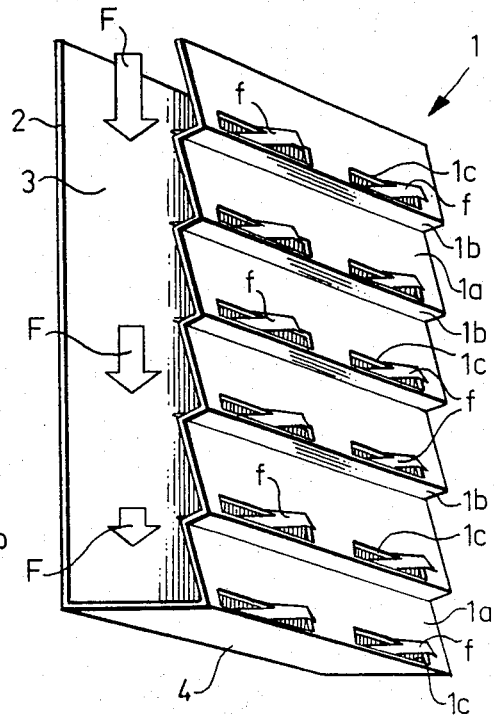
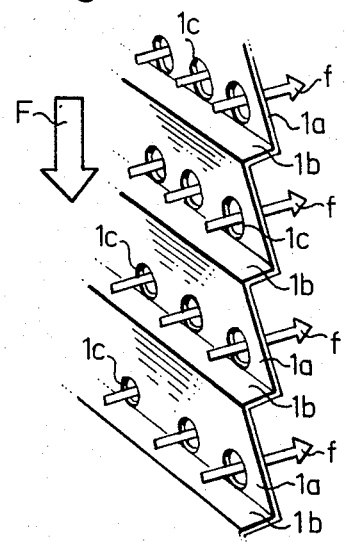

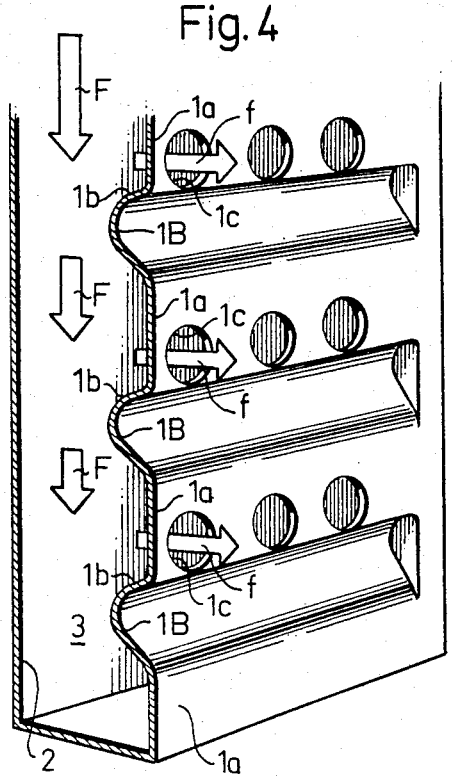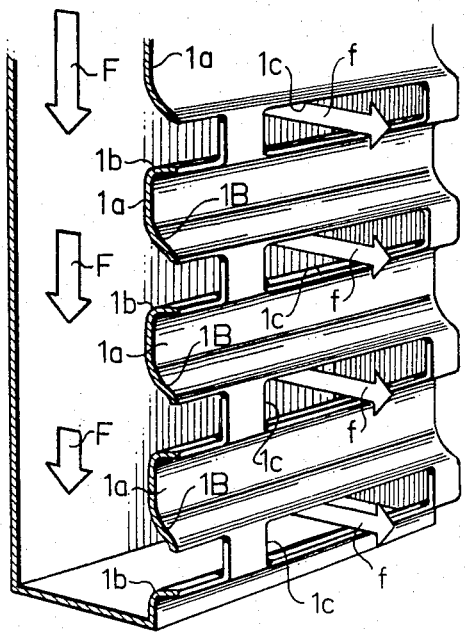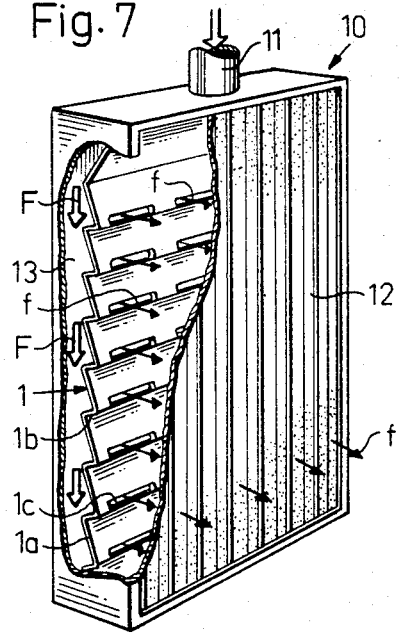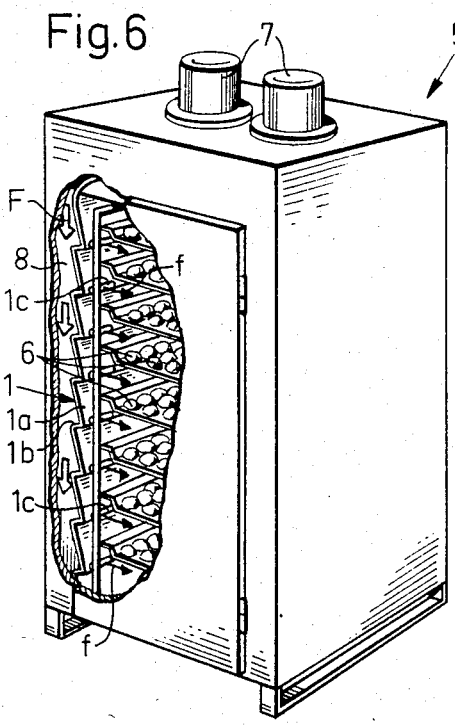

ical Field

FLOW DISTRIBUTOR

TECHNICAL FIELD

The present invention relates to a flow distributor of the kind comprising a perforated defining wall of a duct or chamber having at least one further defining wall, said duct or chamber being arranged to receive a main flow or medium and exhibiting adjacent said perforations deflecting means which project inwardly into the path of the main flow of said fluid and which divide said flow into a plurality of part flows which exit to the other side wall through said perforations transversally of said main flow, said perforated defining wall comprising a profiled plate having profile sections or wall sections which extend transversally of the direction of the main flow.

STATE OF THE ART

A flow distributor in the form of a pipe or tube is described in U.S. Pat. No. 4,170,930 (Lind). The perforations may optionally house a plurality of nozzles which project into the path of the main flow and divide said flow into a corresponding number of uniformly distributed part flows of mutually equal magnitude. The nozzles are suitably formed so that the flow rate of the part flows corresponds substantially to the flow rate of the main flow upstream of the first nozzle.

Another flow distributor is described in German Open-to-public print 29 41 276 (Lind). This distributor comprises a planar wall provided with inwardly projecting lips or nozzles.

German Lay-out print 1,124,658 (Krantz) describes a perforated air-duct comprising obliquely directed wall portions in the region of the holes or perforations for the exit of air. The object of said sloping wall portions is to compensate for the oblique component of the air's flow velocity. Thus, there are no deflecting means of the kind here under concern which project into the path of the main flow. Separate wall portions which are present and which extend transversally of the main flow are namely not intended to serve such a purpose and, further, cannot do so as they are positioned too far away from the holes or perforations.

German Open-to-public print 1,759,782 (Gebr. Sulzer) describes a roof having openings for the exit of air. The exit openings are provided in an airtight flexible membrane which may have a corrugated shape. No separate deflecting means are present.

OBJECT OF INVENTION

One object of the present invention is to provide a multi-purpose flow distributor which is simpler and more efficient than known flow distributors.

BRIEF DISCLOSURE OF THE INVENTION

In its widest aspect, a flow distributor according to the invention is mainly characterized in that the profile sections extending transversally of the direction of the main flow are positioned immediately downstreams of one or more perforations and form its or their deflection means.

A flow distributor comprising a profiled plate in accordance with the invention can be produced much more cheaply than, for example, a tubular flow distributor, and enables, for example, a flow of medium to be effectively distributed and deflected in a given direction over a wide area, which is often desirable of such distributors or is a requirement thereof.

The flow distributor according to the invention can be used, for example, to distribute a main flow of medium across a surface for ventilation purposes, for example. The flow distributor can also be used in hot-air ovens and rapid-cooling apparatus where hot or cold air is to be uniformly distributed over products to be heated or cooled. Other fields where the flow distributor according to the invention can be used include drying plants and fluidized beds.

There is no limitation with regard to the dimensions of the perforations or apertures. Small apertures (some few millimeters in size) can be used when a laminar flow is desired, while large apertures can be used when a strong turbulence is required, as with drying plants or furnaces.

By giving the profile sections and the exit apertures a suitable shape and size, it is possible to obtain the same pressure in all said exit apertures, while the profile sections extending transversally of the direction of the main flow convert the dynamic pressure of the flow to static pressure in respective exit apertures.

Thus, the exiting part flows will be of mutually equal magnitude and directed transversally of the main flow. Different flow conditions can be obtained, by suitable selection of different wall profiles and different aperture shapes and sizes.

Large profile sections and large apertures will result in strong turbulence, while small profile sections and small apertures will result in weak turbulence or in a laminar flow.

The exit apertures need not be circular in shape, but may be, for example, elongate (rectangular or oval) at right angles to the main flow. In this way, a plurality of mutually parallel slot-like air jets are obtained substantially at right angles to the main flow. This embodiment has been found highly suitable in, for example, rapid cooling apparatus and ovens and furnaces, since the planar air jets can be directed between the products undergoing treatment therein.

Another advantage afforded by the invention is that the perforated plate is extremely rigid, due to its profiled shape. Because of the rigidity afforded by the profiling of the plate, the plate can be relatively thin, which simplifies its manufacture and reduces the costs. The perforated plate can also be formed so as to enable it to be readily exchanged, thereby enabling a distributor having a different function to be substituted therefor. The plate is also smooth, i.e. does not exhibit cracks or cavities in which dust can collect. The plate is therefore easy to clean, which in this respect is an advantageous difference to other flow distributors having lips or nozzles which project into the path of the main flow.

One important advantage afforded by the flow distributor according to the invention is that it operates at a low decibel level, i.e. it is not noisy in operation.

Even though it is possible within the scope of the basic concept of the invention for the length of the profile sections projecting into the main flow to be relatively short and for the profile sections to be arranged, for example, in steps on the inside of said perforated defining wall - in which case adjacent apertures are distributed at different levels over the surface of said wall - the profile sections preferably have a substantial length transversally of the direction of said main flow. This namely facilitates the manufacture of the profiled defining wall.

The biggest advantages are obtained in the above respect when all profile sections are substantially planar and extend along substantially the whole length or width of the wall, transversally of the direction of the main flow.

In practice the shortest distance between one profile section and the edge of one adjacent perforation shall be smaller than 1/10 of the extension or width of the said profile section transversally of the main flow.

Said width shall in turn be at least as big as the height of the aperture in parallel with the main flow. The shortest distance between one profile section and the edge of one adjacent perforation shall therefore preferably be smaller than 1/10 of the said perforation's height in parallel with the main flow. An uneven flow distribution will occur if the distance between the profile sections and the apertures is too big.

In order to ensure that the part flows exit in the aforementioned desired direction, the profile sections in accordance with a preferred embodiment form an angle of between 90° and 120° with the direction of the main flow. It is preferred that the profile sections form an angle of exactly 90° with the main flow direction, although acceptable results can be obtained when the profile sections are inclined to the direction of the main flow, i.e. up to 30°, as indicated by the aforementioned angle range of 90° to 120°. The profile sections, however, should not slope against the direction of the main flow, i.e. form an angle of markedly less than 90° with said direction, since the part flows would not then follow a mutual, uniform course.

In practice, the plate is provided between the profile sections with substantially planar apertured parts which extend substantially parallel with, or are slightly inclined to the direction of the main flow, to form an arrangement of steps or shoulders. In this way, the shaped and apertured defining wall obtains an outer surface of sawtooth configuration, in which the profile sections serving as deflectors or baffles form mutually parallel shoulders between intermediate planar, apertured sections.

In this respect, the area of the planar, apertured parts is preferably much greater than the area of the profile sections.

The various parts or sections of the plate need not be bordered by sharp folds or edges. For example, according to one embodiment of the invention, the plate may instead exhibit corrugations which curve inwardly and outwardly, towards and away from the direction of the main flow, and which connect with one or more apertures, part of which corrugation therewith forming said profile sections. In this embodiment, the profile sections need not be fully planar, but may be curved to a greater or lesser extent. If the bottoms and crests of the corrugations are curved, it is difficult to define exactly how much of the respective corrugations for the profile sections are necessary for distributing the main flow. This is not important, however. The only requirement is that those parts of the corrugations which are to serve as profile sections extend transversally of the direction of the main flow by an amount corresponding to or greater than the height of the perforations, i.e. extension parallel with the direction of the main flow.

A number of embodiments of the invention will now be described in more detail with reference to the accompanying drawings.

BRIEF DESCRIPTION OF THE DRAWINGS

FIG. 1 is a perspective view of a first embodiment of a flow distributor according to the invention.

FIG. 2 is a perspective view of a second embodiment, which is a slightly modified version of the FIG. 1 embodiment.

FIG. 3 shows in larger scale and in perspective a part of the embodiment illustrated in FIG. 1.

FIGS. 4 and 5 are perspective cut views of two modified embodiments, in which the perforated wall section of the flow distributor exhibits inwardly and outwardly curved corrugations.

FIG. 6 is a perspective view, partially cut away, of a hot air oven embodying a flow distributor according to the invention.

FIG. 7 is a perspective view of a box-shaped air intake screen having a perforated side surface and containing an intermediate defining wall of a flow distributor according to the invention.

DESCRIPTION OF PREFERRED EMBODIMENTS

In FIGS. 1-3 there is shown a flow distributor in the form of a perforated and profiled plate 1 which forms one defining wall of a pressure chamber. The pressure chamber is also defined by a rear wall 2, two side walls 3 and a bottom wall 4. A flow of medium, which may be air, is fed to the pressure chamber in the direction of the arrow F.

The profiled plate 1 forming the front defining wall of the pressure chamber comprises substantially planar front sections 1a and profile sections or shoulder sections 1b which extend transversally of the direction of flow of said medium and which together form an arrangement of steps, such as to impart a sawtooth configuration to the edge of said plate. Arranged in the substantially planar wall sections 1a of the plate adjacent the profile or shoulder sections 1b is a plurality of apertures 1c.

The profile sections 1b extending into the flow path F of the medium serve as deflectors or baffles which divide the main flow of medium into a multiple of part flows which exit from the pressure chamber to the opposite side of wall 1, through apertures 1c, transversally of the flow direction F.

The width or length of the profile sections 1b is equal to the distance between the two side walls of the pressure chamber, i.e. is equal to the full width of the plate 1. The profile sections or shoulders are also substantially planar or smooth and extend into the path of the main flow while forming an angle of approximately 90° with the direction of movement of said flow.

The profile sections 1b are positioned immediately downstreams of the apertures 1c. In practice the shortest distance between one profile section 1b and the edge of an adjacent aperture shall not exceed 1/10 of the width of said section transversally of the main flow. Said width shall in turn be at least as big as the height of the aperture 1c in parallel with the main flow F. If these requirements are not present an uneven flow distribution will occur.

All the part flows f exiting through the apertures 1c are mutually of the same magnitude. The distance through which the profile sections 1b extend into the path of the main flow is equal to or greater than the height of apertures 1c, i.e. the extension of the apertures parallel to the direction F of the main flow.

The embodiment illustrated in FIG. 2 is similar to that of FIG. 1, with the main exception that the apertures 1c are fewer in number and are longer, i.e. are elongated to greater and lesser extents, or are of oval shape.

FIG. 3 shows a part of FIG. 1 in larger scale, and illustrates how, when striking respective profile sections 1b, serving as deflectors, the main flow of medium is divided into part flows which are deflected at 90° to the direction of main flow F and passed to the other side of plate 1 thorugh apertures 1c.

FIGS. 4 and 5 are perspective cut views of two modified embodiments of a pressure chamber defined on one side by a flow distributor according to the invention. In the embodiment illustrated in FIG. 4, the flow distributor has the form of a plate provided with inwardly curved corrugations 1B and apertures 1c. The corrugations 1B are formed immediately adjacent respective apertures 1c and project into the path of the main flow of medium downstream of respective apertures. The upper surface 1b of respective corrugations 1B in FIG. 4 may have a smaller curvature than the remainder of the corrugation and corresponds to the deflecting means 1b of the embodiments illustrated in the earlier Figures. In the FIG. 4 embodiment, each profile section or deflector 1b forms an angle of about 100° to 110° with the direction F of the main flow. In practice this angle may have a highest value of 120°. If the angle is greater, the flow distribution will be so affected that the flow of medium through the apertures 1c will be uneven, i.e. the part flows will be of mutually different magnitudes.

In the FIG. 5 embodiment, the plate 1 is provided with outwardly curved corrugations 1B. In this case, the deflecting means is formed by the lower surface of the corrugation adjacent a respective aperture immediately downstream of said corrugation, and is analogous with the profile section 1b of the earlier embodiments. In the illustrated embodiment this lower surface of respective corrugations forms an angle of about 100° with the direction F of the main flow of medium, although it may also form an angle of up to 120°.

FIGS. 6 and 7 are partly cut perspective views of two applications of the flow distributor according to the invention. Thus, FIG. 6 illustrates a hot air oven 5 for instance for baking rolls 6.

By means of fans 7 a flow F of hot air is supplied to a chamber 8 defined on one side by a perforated wall comprising a profiled plate 1 with slit openings 1c and of the general configuration illustrated in FIG. 2.

The arrangement accomplishes a very even distribution of the circulating hot air so that the rolls 6 will be uniformly baked irrespective of their position in the oven. It also appears that the flow distributor proper has a very simple and cheap design suitable for masspro- duction.

The same simple design is the outstanding feature also of the flow distributor in the box-shaped air intake screen 10 illustrated in FIG. 7. The deflection means constituted by the profile sections 1b of plate 1 evenly distribute air supplied via an intake pipe 11 to the opposite side of the wall 1 in the screen 10. Said wall 1 is located at a distance from a perforated outer side surface 12 of the screen 10 and forms, thus, an intermediate wall defining an air-intake pressure chamber 13 of the screen. When leaving the outer perforated side surface 12 the air will have a very low velocity. By using a screen 10 large quantities of fresh air can be supplied to, for instance, a working location in a dusty environment without creating draughts.

INDUSTRIAL APPLICABILITY

Above it has been explained and illustrated that the perforated and profiled plate of the flow distributor according to the invention may be designed in a number of ways which to a rather great extent differ from each other. Further, it has been shown that the flow distributor may be used in a number of different types of apparatuses such as ovens, devices for ventilating purposes, cooling apparatuses, drying plants and fluidized beds. Many other types of such apparatuses are evident to the artisan. In these apparatuses the distributed medium is as a rule a gas such as air. However, the invention is also applicable for distributing fluids, i.e. liquids. The general design of the flow distributor will, thus, be the same and within the scope of the attached claims, irrespective of the medium handled and distributed.

In all different embodiments the flow distributor may comprise a detachable apertured plate, and a number and size of the appertures 1c and the width of the deflecting section 1b may vary from plate to plate so that differing functions required of a flow distributor from time to time can be readily met by substituting one plate for another.

I claim:

1. A flow distributor for uniformly distributing fluid flow, said flow distributor comprising:
   a wall;
   at least one further wall spaced from and extending parallel to said wall;
   a chambr defined by said wall and said at least one further wall, said chamber adapted to receive flow of a fluid;
   rows of perforations defined by said wall, each said row including at least one perforation;
   profile sections defined by said wall extending into said chamber in a direction transverse to the flow of said fluid for deflecting the flow of said fluid from said chamber to said rows of perforations to divide said fluid into a plurality of uniform flow parts as the fluid flows from said chamber through said rows of perforations in a common direction transverse to the direction of the flow of said fluid and for strengthening said wall;
   each profile section being located adjacent to one row of perforations in a downstream direction from said one row of perforations along the flow of said fluid, and a distance between an edge of each row of perforations and their respective adjacent profile section being less than 1/10 of the height of the respective adjacent row of perforations;
   said profile sections being substantially planar and extending into said chamber in said direction transverse to the direction of the flow of said fluid, substantially along the width of said wall;
   the width of said profile sections extending into said chamber in said direction transverse to the direction of the flow of said fluid being at least equal to the height of the respective adjacent row of perforations; and
   planar sections defined by said wall, each of said planar sections including one of said rows of perforations, said planar sections being located between said profile sections, and said planar sections extending substantially parallel to the direction of flow of said fluid to form a stepped arrangement with said profile sections and the area of the planar sections being substantially greater than the area of the profile sections.

2. A flow distributor according to claim 1, wherein the shortest distance between one of said profile sections and an edge of the respective adjacent row of perforations being less than 1/10 of the width of the respective adjacent profile section extending into said chamber in said direction transverse to the direction of the flow of said fluid.

3. A flow distributor according to claim 1, wherein said profile sections form an angle of between 90° and 120° with the direction of flow of said fluid.

4. A flow distributor according to claim 1, wherein said perforated defining wall includes corrugations and a substantially planar part of each corrugation forms said profile sections.

5. A flow distributor according to claim 4, wherein said corrugations curve inwardly towards the chamber.

6. A flow distributor according to claim 4, wherein said corrugations curve outwardly from the chamber.

7. A flow distributor according to claim 1, wherein the at least one preforation of each row of perforations is located parallel to the flow of said fluid and said flow parts pass through said rows of perforations in a direction perpendicular to the flow of said fluid.

8. A flow distributor according to claim 1, wherein the at least one perforation of each said row of perforations is aligned parallel to the flow of said fluid.

9. A flow distributor according to claim 3, wherein said profile sections form an angle of 90° with the direction of flow of said fluid.

* * * * *